United States Patent
Meyerhofer

(10) Patent No.: US 8,419,532 B2
(45) Date of Patent: Apr. 16, 2013

(54) DISTRIBUTED PROMOTIONAL COUPON SYSTEM FOR A GAMING ENVIRONMENT

(75) Inventor: Eric Meyerhofer, Pasadena, CA (US)

(73) Assignee: FutureLogic, Inc., Glendale, CA (US)

( * ) Notice: Subject to any disclaimer, the term of this patent is extended or adjusted under 35 U.S.C. 154(b) by 1023 days.

(21) Appl. No.: 12/065,967

(22) PCT Filed: Sep. 6, 2006

(86) PCT No.: PCT/US2006/034694
§ 371 (c)(1),
(2), (4) Date: Dec. 29, 2008

(87) PCT Pub. No.: WO2007/030526
PCT Pub. Date: Mar. 15, 2007

(65) Prior Publication Data
US 2011/0098104 A1    Apr. 28, 2011

Related U.S. Application Data

(60) Provisional application No. 60/714,633, filed on Sep. 6, 2005.

(51) Int. Cl.
*A63F 9/24* (2006.01)

(52) U.S. Cl.
USPC .................. 463/29; 463/25; 463/42

(58) Field of Classification Search ............. 463/16–20, 463/25–29, 42
See application file for complete search history.

(56) References Cited

U.S. PATENT DOCUMENTS

| | | | |
|---|---|---|---|
| 7,594,855 B2 * | 9/2009 | Meyerhofer | 463/42 |
| 7,666,078 B2 * | 2/2010 | Meyerhofer | 463/1 |
| 2004/0132529 A1 * | 7/2004 | Mkrtchyan et al. | 463/29 |

* cited by examiner

*Primary Examiner* — Omkar Deodhar
(74) *Attorney, Agent, or Firm* — Frank L. Cire

(57) ABSTRACT

Methods and apparatuses for a distributed promotional coupon system for use within a casino which has cash-less gaming machines involving a plurality of game installed cash-out Voucher Printers networked to a central server. A central coupon server harnesses the processing power of the plurality of printers, tasking each one to analyze the player activity of the game into which it is installed. Handshaking and signaling between the server and the plurality of printers ensure that the server was system master, approving the issuance of all coupons. One advantage of the system is the simplification of the server whose real-time processing requirements become more of data routing than analysis.

36 Claims, 5 Drawing Sheets

US 8,419,532 B2

DISTRIBUTED PROMOTIONAL COUPON SYSTEM FOR A GAMING ENVIRONMENT

CROSS-REFERENCE TO RELATED APPLICATION

This application claims the benefit of U.S. Provisional Patent Application No. 60/714,633, filed Sep. 6, 2005, the contents of which are hereby incorporated by reference as if stated in full herein.

BACKGROUND OF THE INVENTION

This invention relates generally to printers and printer connected hardware used in cash-less slot machines and gaming, and more specifically to hardware and software operating within this equipment performing promotional ticket printing, promotional data basing and printer and printer connected hardware based promotional ticket triggering.

The gaming machine manufacturing industry provides a variety of gaming machines for the amusement of gambling players. An exemplary gaming machine is a slot machine. A slot machine is an electro-mechanical game wherein chance or the skill of a player determines the outcome of the game. Slot machines are usually found in casinos or other more informal gaming establishments.

The gaming machine manufacturers have provided cash-less enabled games to the market for the last five years, and there now exists a broad population of such games in the casino industry. Cash-less enabled games are so named due to the fact that they can conduct their player's financial exchange with a mixture of traditional paper and coin currency and vouchers redeemable for cash or game credits.

Two pieces of necessary equipment for a cash-less enabled game is a printer to produce the vouchers, and a bill acceptor that supports automatic reading of the vouchers. In a cash-less enabled gaming system, when a player cashes out, the game is signaled and depending on the size of the pay out, it can either present coins in the tradition method of a slot machine, or it can cause the printers which are installed in such machines to produce a voucher including the value of the pay out. The voucher may then either be redeemed for cash at the cashier's cage for currency, or it may be inserted into one of the casino's games' bill acceptor, at which point the network and server to which the game is connected will recognize the voucher as valid, redeem it and place the appropriate amount of playing credits on the game.

Over the years, cash-less enabled games have found an increasing acceptance and use in the gaming industry with both the players, who enjoy the speed of play and ease of transporting their winnings around the casino, and the casinos who have realized significant labor savings in the form of reduced coin hopper reloads in the games, and an increase in revenue due to speed of play. The broad installation base of cash-less enabled games guarantees a wide installed base of networked games and their installed printers which may be used to print coupons and promotions for the captive player audiences.

In typical casino operations, the games are networked to a main server which monitors various metrics of activity on the games for regulatory, accounting and promotional activities related to frequent player club cards which participating patrons insert into the games when they play. The server related to promotions for player club cards is referred to as the Player Tracking Sever. Gaming machines share real-time play metrics with the Player Tracking Server in order to support frequent player incentives.

DEFINED TERMS

As used, the following definitions apply:

"PCS" "Promotional Coupon System". This is the system which is responsible for creating and managing promotional coupons in the gaming environment.

"GVP" "Game Installed Voucher Printer". This is the printer attached to a slot machine, gaming machine, gaming table or casino installed kiosk with a primary responsibility of the printing of cash-out vouchers.

"Gaming Machine", "Game Machine", or "Game" A slot machine, gaming machine or game table in a casino.

PTS "Player Tracking System" The system installed in a casino used to monitor game play activity by participating players. A PTS is a rudimentary part of the existing casino industry architecture.

"Cash-Out Voucher System" The system installed in a casino used to create cash-out voucher records and issued data packets to gaming machines which will cause it to print a cash-out voucher. A cash-out voucher system is a rudimentary part of the existing casino industry architecture for casinos supporting cash-less gaming.

"Point-of-Sale System" The system installed in a casino at various locations where business in the casino is transacted, such as a retail shop, restaurant, ticket sales counter, front desk, etc.

"Coupon Trigger Metrics" are defined below.
"Coupon Issuance Control Parameters" are defined below.
"PSP" "Player Session Packets" are defined below.

SUMMARY OF THE INVENTION

In one aspect of the invention, a gaming environment promotional system includes a central data processing unit which serves as a Promotional Coupon System (PCS) and a plurality of Gaming machine installed Voucher Printers (GVP). Each GVP is coupled through a primary communication port to a controller of the gaming machine into which the GVP is installed, with each GVP further coupled to the PCS through a second auxiliary port. The GVP receives signaling for cash-out vouchers through the primary communication port and signaling for coupons on or through the second auxiliary port.

In another feature of the invention, the plurality of GVP's are coupled to the PCS by a promotional network dedicated to the PCS-GVP connection, each GVP individually signaled by the PCS by means of a unique address.

In another feature of the invention, a GVP is coupled to the PCS by means of the network which connects the plurality of gaming machines within the casino to the casino's PTS (existing network for frequent player awards), and the GVP is a sub-addressable device within the gaming machine available to the PCS.

In another feature of the invention, the PCS is the PTS and the PTS's associated network.

In another feature of the invention, the PCS is coupled to the GVP through a dedicated PCS-GVP network, creating a logical link between the GVP's unique network address and the gaming machine into which the GVP is installed for the purposes of correlating the GVP's gaming machine identifier. The link is created by the GVP extracting the gaming machine address or number from voucher data signaling from the gaming machine controller on the GVP's primary communication port. The GYP then signals the PCS with both the GVP's unique address and the extracted gaming machine address or number, and the PCS stores the link in the PCS's memory.

In another feature of the invention, the PCS, is coupled to the GVP on a dedicated PCS-GVP network, creating a logical link between the GVP's unique network address and the gaming machine into which the GVP is installed for the purposes of correlating the GVP's gaming machine identifier, the link created by the GVP reading operator configurable gaming machine identifier address switches coupled to the GVP's processor, the GVP signaling the PCS with both its unique address and the configured gaming machine identifier address, and the PCS storing the link in its memory.

In another feature of the invention, the PCS, is coupled to the GVP on a dedicated PCS-GVP network, creating a logical link between the GVP's unique network address and the gaming machine into which the GVP is installed for the purposes of correlating the GVP's gaming machine identifier, the link created by the GVP is signaled as to its gaming machine identifier address by an operator controlled external device temporarily coupled to the GVP at the time the GVP is installed in a gaming machine, the GVP signaling the PCS with both its unique address and the operator controlled external device supplied gaming machine address, and the PCS storing the link in its memory.

In another aspect of the invention, the GVP is temporarily coupled to an operator controlled external device at the time the GVP is installed in a gaming machine, the GVP receiving signaling as to the gaming machine identifier address of the gaming machine into which it is installed, and the GVP storing the gaming machine identifier address into memory coupled to its processor.

In another aspect of the invention, the GVP signaling the PCS as to the gaming machine identifier address in which it is installed upon boot-up or when requested by the PCS.

In another aspect of the invention, the GVP's unique network address is configured by operator configurable address switches coupled to the GVP's processor.

In another aspect of the invention, the GVP's unique network address is assigned by the PCS, the GVP storing its address in memory for permanent use until a new address is assigned by the PCS.

In another aspect of the invention, the GVP storing the identification of the gaming machine identification into which it is installed into memory coupled to the GVP's processor.

In another aspect of the invention, the GVP's unique network address is a fixed value as a function of its hardware.

In another feature of the invention, the GVP is coupled to both the PCS and the cash-out voucher system (responsible for the creation of cash-out vouchers), the PCS and cash-out voucher system is coupled to each other, the cash-out voucher system sending a data packet to the GVP via its link to the gaming machine, the GVP forwarding information from the data packet along with its unique network address to the PCS, the cash-out voucher system sending information from the same the data packet to the PCS, the PCS creating a logical link between the GVP's unique network address and the gaming machine into which the GVP is installed for the purposes of correlating the GVP's gaming machine identifier, and the PCS storing the link in its memory.

In another feature of the invention, the GVP includes an algorithm which, after boot-up, determines if a previously recorded gaming machine identifier exists in its memory, the identifier serving the purpose of signaling the GVP into which gaming machine it is installed, the algorithm then signaling the PCS with the identifier.

In another feature of the invention, the GVP includes an algorithm which causes the GYP, after boot-up, to first receive cash-out voucher signaling from the gaming machine over its primary port, and the GVP then verifying that the gaming machine identifier is the same as the gaming machine identifier previously recorded in its memory as to which Game the GVP is installed.

In another aspect of the invention, the PCS broadcasting the time and date on a periodic basis to a GVP to which it is coupled, the GVP using the time and date data to synchronize its own internal clock.

In another aspect of the invention, the GVP upon receiving cash-out voucher signaling from the gaming machine over its primary port, extracting the time and date from the data and using the time and date information to synchronize its internal clock.

In another aspect of the invention, the PCS is coupled to the PTS, the PCS receiving gaming machine activity data from the PTS which is monitoring the Game, the PCS utilizing its link table in memory (described above) to determine the unique network address of the GVP installed in the Game, and the PCS sending information extracted from the activity data to the GVP installed in the Game.

In another aspect of the invention, the GVP receiving player activity data of the Game in which it is installed from the PCS, the GVP processing the data according to algorithms (described below) contained in its memory, the GVP determining if a promotional award has been triggered by the player activity and the type of the award, the GVP signaling the PCS as to various metrics of the triggered promotional award, the PCS processing the metrics of the promotional award, the PCS operating an algorithm to create a validation identifier for the award coupon, the PCS signaling the GVP with data includes the validation identifier and authorization to print the promotional coupon, the GVP printing the coupon, and the GVP signaling the PCS as to the completion or failure of its print job.

In another aspect of the invention, the PCS is coupled to the PTS, the PCS receiving gaming machine activity data from the PTS which is monitoring the Game, the PCS processing the data according to algorithms (described below) contained in its memory, the PCS determining if a promotional award has been triggered by the player activity, the PCS determining the type of award from a database in its memory, the PCS operating an algorithm to create a validation identifier for the award coupon, the PCS signaling the GVP with data includes the validation identifier and authorization to print the promotional coupon, the GVP printing the coupon, and the GVP signaling the PCS as to the completion or failure of its print job.

In another aspect of the invention, the PCS having received the signaling from the GVP as to the completion or failure of a promotional award print job (described above), and the PCS creating a record in its memory as to the issuance of the promotional award coupon.

In another aspect of the invention, the PCS sending static data to the GVP, the static data is various fixed portions of the printed indicia of promotional award coupons to be utilized by the GVP in future promotional award coupon creation, the static data optionally includes Coupon Trigger Metrics (defined below), the static data optionally includes Coupon Issuance Control Parameters (defined below), and the static data further includes a unique promotional campaign identifier, and the GVP storing the static data in memory coupled to its processor.

In another aspect of the invention, the PCS sending variable data including portions of the printed indicia of promotional award coupons to the GVP, the variable data further includes a unique promotional campaign identifier, the GVP confirming that the campaign identifier matches that of any fixed printed indicia data previously stored in its memory, the GVP combining the fixed and variable portions of indicia data, and the GVP printing a promotional award coupon.

In another aspect of the invention, the PCS requesting the GVP to send status as to the identifier of the promotional campaign static data file (described above) which resides in the GVP's memory, the PCS determining if the campaign identifier in the GVP is the version matches the identifier of the promotional campaign that the PCS is currently operating, and if not, the PCS sending new promotional campaign static data to the GVP which matches the promotional campaign which the PCS is operating.

In another aspect of the invention, the communications between the PCS and GVP is encrypted by a methodology known to the PCS and GVP, and the PCS and GVP processing incoming and outgoing communications according to the encryption method.

In another aspect of the invention, the communications between the PCS and the PTS is encrypted by a methodology known to the PCS and PTS, and the PCS and PTS processing incoming and outgoing communications according to the encryption method.

In another aspect of the invention, the PCS includes a record of promotional award coupons issued by the GVPs in its memory, the PCS is coupled to a Point-of-Sale System, the PCS receiving signaling from the Point-of-Sale System when a coupon is redeemed as to the validation sequence of the coupon, the PCS checking the validity of the coupon against its records, the PCS signaling the Point-of-Sale System as to the validity of the coupon, and the PCS recording the redemption of the coupon in its memory.

In another aspect of the invention, the PCS is coupled to an accounting system, and the PCS transmitting data related to outstanding and redeemed promotional award coupons from its database in memory.

In another aspect of the invention, the PCS is coupled to the PTS, and the PCS transmitting data related to outstanding and redeemed promotional award coupons from its database in memory.

In another aspect of the invention, the GVP receiving signaling from the PCS on its secondary auxiliary port to print a coupon, the GVP holding the coupon data in its memory, the GVP receiving signaling from the gaming machine to which it is coupled on its primary port to print a cash-out voucher, the GVP printing the cash-out voucher, and when successfully completed, printing the coupon from the coupon data held in its memory.

In another aspect of the invention, the PCS includes a coupon trigger database which contains various play metrics that will cause the PCS to request the GVP to produce a coupon when satisfied, the metrics is listed here and referred to as "Coupon Trigger Metrics":
 (a) anytime a cash-out voucher is printed,
 (b) a cash-out voucher for greater than, equal to, or less than a specified amount of money is printed,
 (c) the amount of money wagered over a particular time period,
 (d) the amount of money won over a particular time period,
 (e) the amount of money lost over a particular time period,
 (f) the duration of play on the Game,
 (g) anytime a player adds money or credits to a game in an amount greater than, equal to or less than a specified amount.
 (h) the time when the Game is played or cashed-out,
 (i) the day when a Game is played or cashed-out,
 (j) the date when a Game is played or cashed-out,
 (k) the average percentage of the maximum wagering on the Game which the player's activity represents,
 (l) a random percentage chance that a coupon will be issued when a player cashes out,
 (m) for participating frequent player club members, a player's birthday date
 (n) for participating frequent player club members, the classification of the player is applied to modify any of the foregoing metrics.

In another aspect of the invention, the GVP downloading from the PCS Coupon Trigger Metrics, the GVP analyzing Game activity passed to it by the PCS against the Coupon Trigger Metrics, and the GVP producing a coupon when the metrics are satisfied.

In another aspect of the invention, a database is a set of control parameters which selects the type and quantity of coupons to create and issue related to any of the Coupon Trigger Metrics, the control parameters operating separately or in combination with each coupon, the control parameters residing in and is utilized in algorithms on either the PCS or GVP, the control parameters is listed here and referred to as "Coupon Issuance Control Parameters":
 (a) the total quantity of a coupon is issued before it is retired,
 (b) the frequency of issuance of a coupon, one issued every time a specified number of trigger events occurs,
 (c) the frequency of issuance of a coupon based on a random chance of one in every so many trigger events,
 (d) an alternative coupon should a particular coupon fail to print for lack of satisfying all of its Coupon Trigger Metrics and/or its specified set of control parameters,

BRIEF DESCRIPTION OF THE DRAWINGS

These and other features, aspects, and advantages of the present invention will become better understood with regard to the following description and accompanying drawings where.

DETAILED DESCRIPTION OF THE INVENTION

Figure 1:
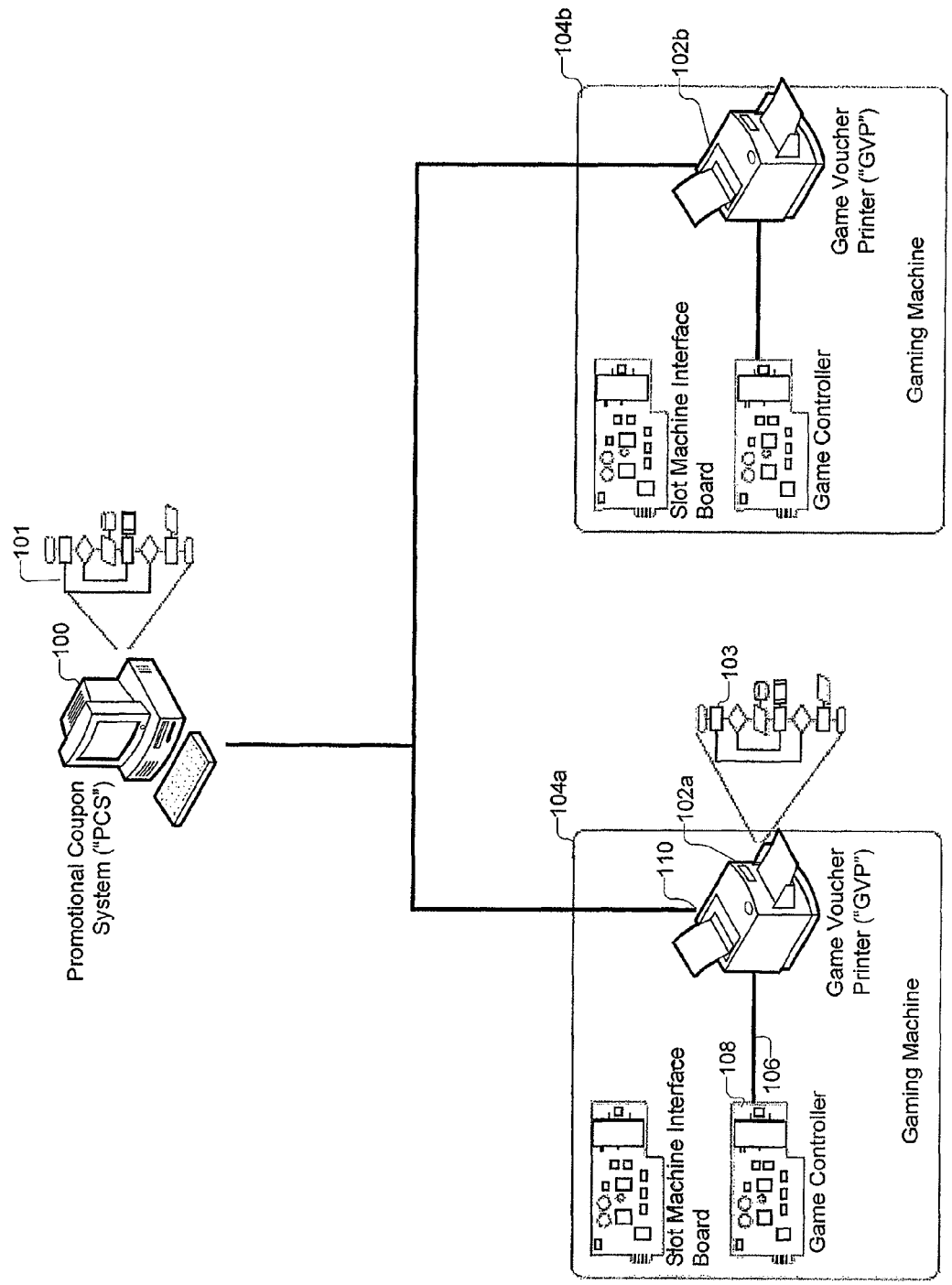
FIG. 1 is an illustration of the an exemplary network interfacing a PCS to a GVP in accordance with an exemplary embodiment of the present invention.

FIG. 1 is an illustration of a block diagram of a PCS 100 connected to one or more GVPs, 102a and 102b installed in respective gaming machines, 104a and 104b. The PCS, as shown in the diagram, is a server whose responsibility is to direct the promotional activity of the gaming machine installed GVPs. The features of the PCS may be implemented by a process or processes 101 encoded in processor executable code and stored in a computer-readable storage medium.

In the system, each GVP has two or more ports. Referring to GVP 102a, a primary port 106 connects the GVP or unit to a controller 108 of the gaming machine in which the GVP is installed for receiving cash-out voucher signals for printing cash-out vouchers, and a second auxiliary port 110 for connection to the PCS for promotional couponing. The features of the GVP may be implemented by a process or processes 103 encoded in processor executable code stored in a computer-readable storage medium.

Each GVP has a unique address by which it can specifically be selected. As an example, in an Ethernet network the GVP's address may be an IP network address on the network. In one embodiment of a GVP in accordance with the present invention, the GVP's unique network address is configured by operator configurable address switches coupled to a processor of the GVP.

In another embodiment of a GVP in accordance with the present invention, the GVP's unique network address is assigned by the PCS and the GVP stores the GVP's address in memory for permanent use until a new address is assigned to the GVP by the PCS.

In another embodiment of a GVP in accordance with the present invention, the GVP stores an identification of the gaming machine into which the GVP is installed into a memory coupled to a processor of the GVP.

In another embodiment of a GVP in accordance with the present invention, the GVP's unique network address is a fixed value as a function of the GVP's hardware.

In another embodiment of a GVP in accordance with the present invention, the GVP, after boot-up, receives cash-out voucher signals from the gaming machine over the GVP's primary port, and the GVP verifies that a first gaming machine identifier in the cash-out signals is the same as a second gaming machine identifier previously recorded in the GVP's memory as to which gaming machine the GVP is installed.

In one exemplary embodiment of a GVP, the GVP, as it has two masters, one is the gaming machine controller and the other is the PCS, arbitrates traffic on the two channels. The complexity of this is increased since the two masters are operating asynchronously from each other. An example of one arbitration scheme would be the GVP always giving priority to a cash-out voucher print job which comes from the gaming machine (on the primary port), and then queuing a coupon print job from the PCS (on the second auxiliary port) behind the voucher. Another example of an arbitration scheme would be the GVP receiving a coupon print job on its second auxiliary port, and then holding the coupon for a period of time awaiting arrival of a cash-out voucher on the primary port. If the cash-out voucher didn't arrive within a reasonable amount of time, the coupon could either be printed or canceled by the GVP.

In another exemplary embodiment of a GVP in accordance with the present invention, in addition to coupon print data, the GVP receives certain static promotional campaign data on its second auxiliary port. The static data includes graphic icons that are used to print the various coupons, portions of the coupons which would never change with an award, and optionally, a set of trigger conditions which would cause the GVP to trigger a coupon.

In another exemplary embodiment of a gaming promotional system in accordance with the present invention, the PCS sends static data to the GVP, the static data including one or more fixed portions of printed indicia for promotional award coupons to be utilized by the GVP in printing promotional award coupons and the GVP stores the static data in a memory.

In another exemplary embodiment of a gaming promotional system in accordance with the present invention, the static data further includes coupon trigger or play metrics.

In another exemplary embodiment of a gaming promotional system in accordance with the present invention, the static data further includes coupon issuance control parameters.

In another exemplary embodiment of a gaming promotional system in accordance with the present invention, the static data further includes a unique promotional campaign identifier.

In another exemplary embodiment of a gaming promotional system in accordance with the present invention, the PCS sends variable data includes portions of printed indicia for promotional award coupons to the GVP. The variable data includes a unique promotional campaign identifier. The GVP confirms that the promotional campaign identifier matches the previously stored static data, combines the fixed and variable portions of indicia data, and prints a promotional award coupon based on the combined fixed and variable portions of indicia data.

In another exemplary embodiment of a gaming promotional system in accordance with the present invention, the PCS requests the GVP to send status as to the identifier of the promotional campaign static data file which resides in the GVP's memory. Then the PCS determines if the campaign identifier in the GVP matches an identifier of the promotional campaign that the PCS is currently operating, and if not, the PCS sends new promotional campaign static data to the GVP which matches the promotional campaign which the PCS is currently operating.

In another exemplary embodiment of a GVP in accordance with the present invention, the PCS broadcasts time and date data on a periodic basis to the GVP, and the GVP uses the time and date data to synchronize the GVP's own internal clock.

In another exemplary embodiment of a GVP in accordance with the present invention, the GVP, upon receiving cash-out voucher signals from the gaming machine over the GVP's primary port, extracts time and date data from cash-out voucher signals and uses the time and date data to synchronize the GVP's internal clock.

Figure 2:
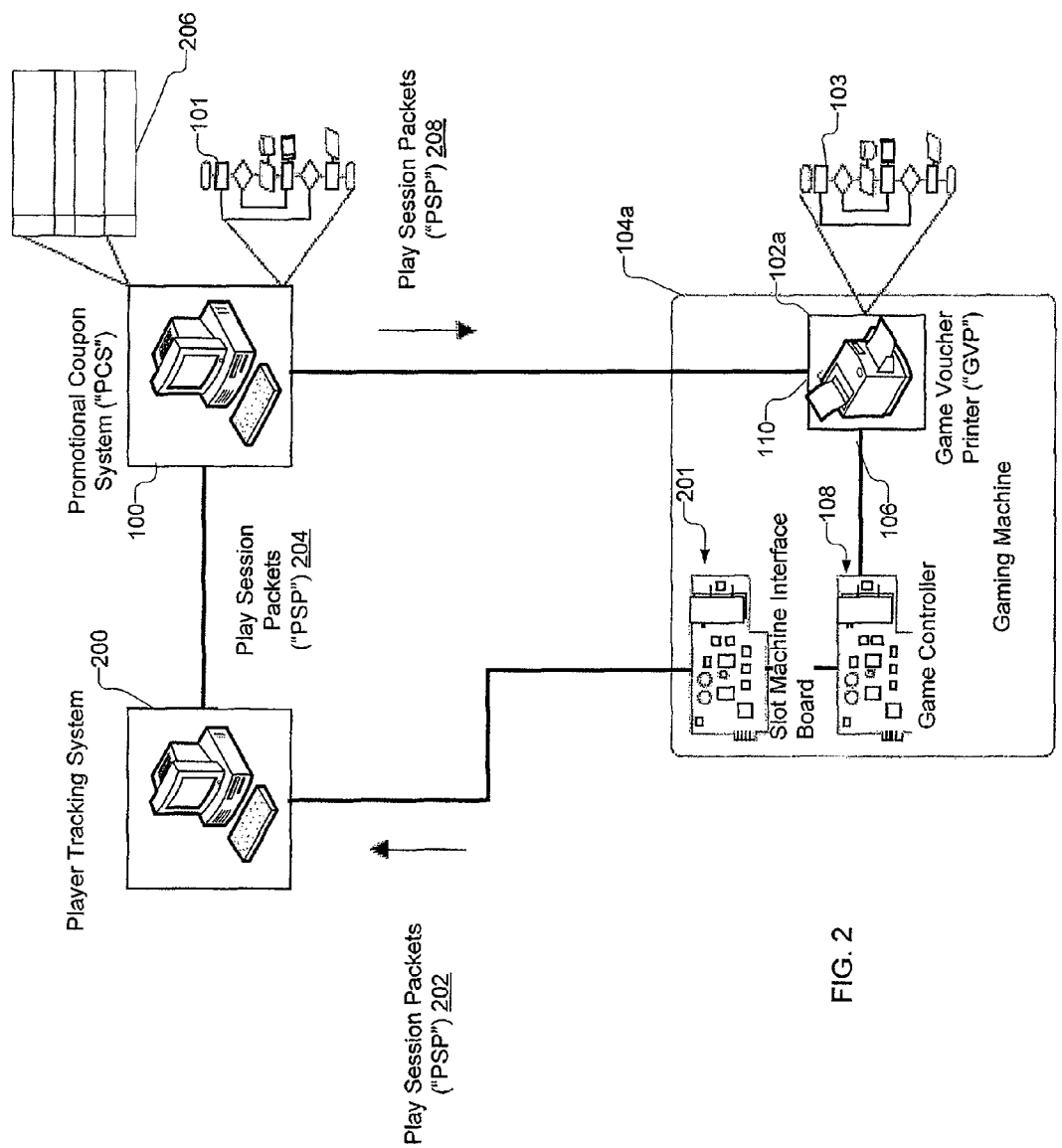
FIG. 2 is an illustration of an exemplary connection of the PCS, the PTS, a gaming machine and the GVP in accordance with an exemplary embodiment of the present invention.

FIG. 2 is an illustration of a block diagram showing the PCS 100, Player Tracking System (PTS) 200, gaming machine 104a and GVP 102a connected in relation to each other. In FIG. 2, the PTS receives information about player activity on the gaming machine 104a via an interface board 201 to which the PTS is connected. As used herein, data packets 202 include player gaming machine activity as Player Session Packets ("PSPs"), and as examples of the data is an indication that a player had bet so much on a particular game, had won or lost the bet, the amount of a win, the amount of money deposited in the machine, if a player was cashing out, and so on.

The PTS then passes the PSP information 204 to the PCS as shown in the diagram. Next, the PCS determines by processing the packet which gaming machine the PSP originated from, looks up from an internal database 206 having a link table in which a GVP network address is related to that gaming machine, and forwards the PSP 208 to that network address, essentially sending it to the GVP.

The GVP then processes information from the PSP to determine if a coupon trigger condition is met. If a condition is met, the GVP informs the PCS of an award, requests a validation identifier for the coupon, and obtains permission from the PCS to print the coupon. If approved, additional handshaking is used to ensure that the coupon was successfully produced by the GVP, and the PCS then logs the validation number and the award type into its internal memory for later reconciliation.

In another exemplary embodiment of a gaming promotional system, the PCS performs the analysis of the PSPs against a set of trigger conditions, and when a condition is met, the PCS signals the GVP with a coupon and a validation sequence for the coupon. Upon receipt of data from the PCS, the GVP produces the requested coupon. In this embodiment, handshaking applicable to the success or failure of the coupon print job would is also conducted.

In addition, as the PTS is coupled to the PCS, the PCS may transmit data related to outstanding and redeemed promotional award coupons from the PCS's memory (not shown) to the PTS.

In one embodiment of a gaming promotional system in accordance with the present invention, communications between the PCS and GVP are encrypted by a methodology known to the PCS and GVP, and the PCS and GVP process incoming and outgoing communications according to the encryption method.

In another embodiment of a gaming promotional system in accordance with the present invention, communications between the PCS and the PTS are encrypted by a methodology known to the PCS and PTS, and the PCS and PTS process incoming and outgoing communications according to the encryption method.

In an exemplary embodiment of a GVP in accordance with the present invention, each GVP is a sub-addressable device within each GVP's respective gaming machine available to the PCS.

In an exemplary embodiment of a gaming promotional system in accordance with the present invention, the functions of the PCS are performed entirely by the PTS. That is, the PCS is a PTS and the PTS's associated network.

Figure 3:
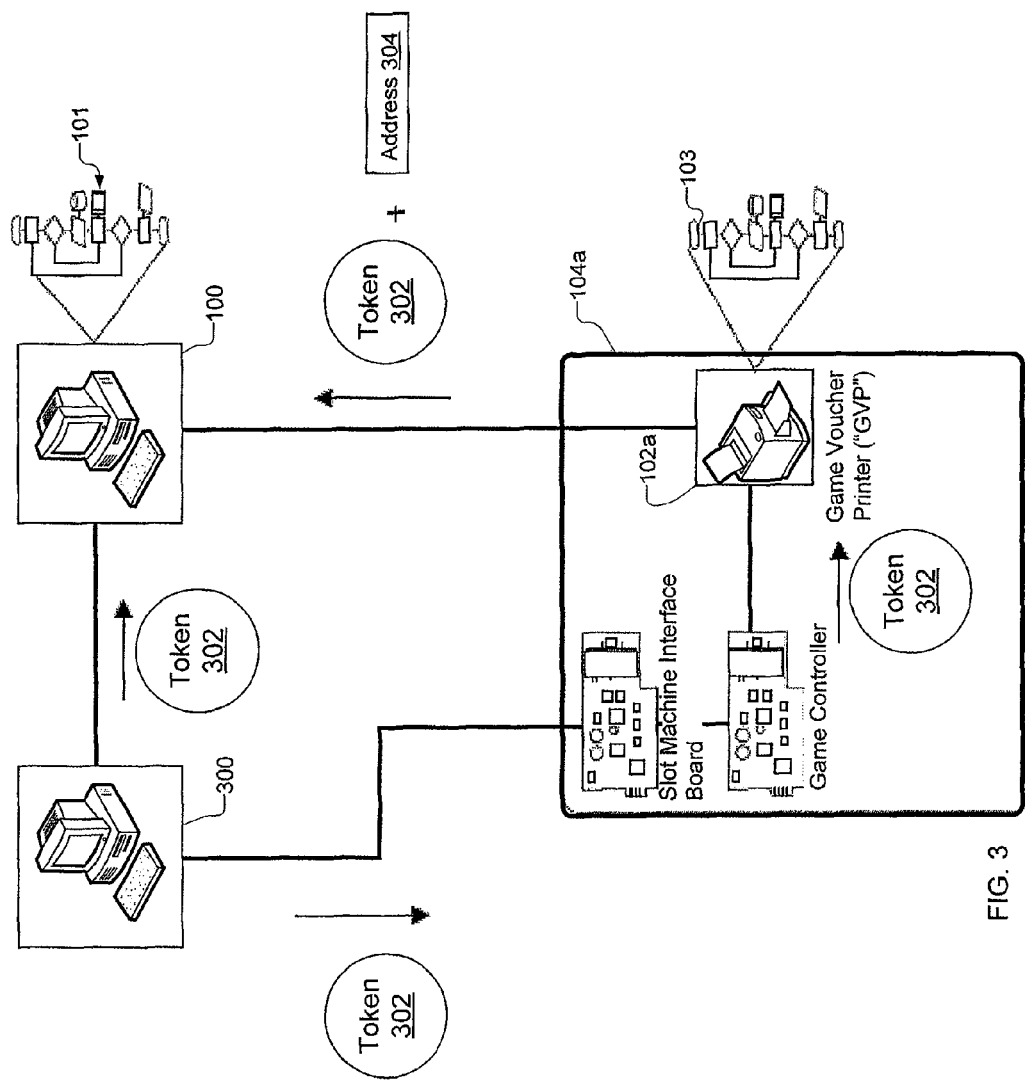
FIG. 3 is an illustration of an automatic method by which the PCS can pair a GVP's unit address to a gaming machine identifier in accordance with an exemplary embodiment of the present invention.

FIG. 3 illustrates an automatic method by which the PCS 100 can pair a GVP's network address to a gaming machine identifier. Within the PCS and its GVP network, there are a plurality of GVPs, each with its own network address, but it may be unknown to the PCS which gaming machine a given GVP is installed in. In FIG. 3, a cash-out voucher system controller 300 issues a unique special non-print ticket, referred to herein as a token 302, to the PCS in addition to sending the token to each of the gaming machines in the network, such as gaming machine 104a. The gaming machine passes the token to the GVP 102a which recognizes the token as the special non-print ticket token.

When the GVP, recognizes the token, the GVP passes the token to the PCS along with The GVP's IP or network address 304. The PCS then forms the database 206 (of FIG. 2) linking GVP network addresses to each GVP's respective gaming machine into which each GVP is installed. Once this relationship has been established, player activity data from a particular gaming machine can then be passed to the GVP installed in that same gaming machine as described in FIG. 2.

In an exemplary embodiment of a promotional gaming system in accordance with the present invention, the PCS is coupled to a plurality of GVPs through a dedicated PCS to GVP network, thus creating a logical link between the GVP's unique network address and the GVP's respective gaming machine for the purposes of correlating the GVP's gaming machine identifier. In operation, the GVP sends signals to the PCS using a link created from the GVP's unique address and gaming machine information from the CVP's respective gaming machine, and the PCS stores the link in a memory.

In another exemplary embodiment of a promotional gaming system in accordance with the present invention, The gaming environment promotional system of Claim 9, wherein the link is created using an extracted gaming machine address from voucher data signals received from a gaming machine controller coupled to the GVP's primary communication port.

In another exemplary embodiment of a promotional gaming system in accordance with the present invention, the link is created using operator configurable game machine identifier address switches coupled to a processor of the GVP.

In another exemplary embodiment of a promotional gaming system in accordance with the present invention, the link is created using a game machine identifier address signaled to the GVP by an operator controlled external device temporarily coupled to the GVP at the time the GVP is installed in the GVP's respective gaming machine.

In another exemplary embodiment of a promotional gaming system in accordance with the present invention, the GVP stores the game machine identifier address into a memory coupled to a processor of the GVP.

In another exemplary embodiment of a promotional gaming system in accordance with the present invention, each GVP signals the PCS as to a game machine identifier address in which the GVP is installed upon boot-up or when requested by the PCS.

Figure 4:
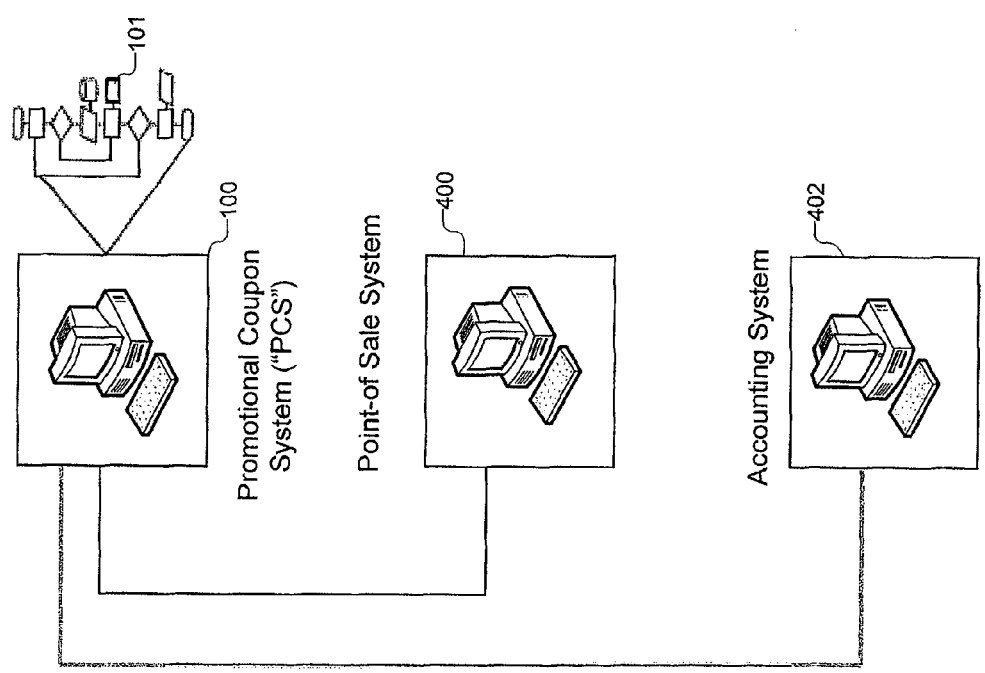
FIG. 4 is an illustration of the connection of the PCS to other casino systems in accordance with an exemplary embodiment of the present invention.

FIG. 4 is an illustration of the connection of the PCS to other casino systems in accordance with an exemplary embodiment of the present invention. The first connection is to a point-of-sale system 400 for the casino or property in order to allow redemption approval when a player goes to cash in their coupon at a participating location. The other connection shown is to the accounting system 402 for the casino. The PCS, upon request, can export a report on all promotional activity, including coupons issued, redeemed and pending or outstanding. This permits the property to perform all accounting reconciliation provides an audit trail.

In one embodiment of a gaming promotional system, the PCS stores records of promotional award coupons issued by GVPs 102a and 102b (of FIG. 1) in memory (not shown). The PCS receives signaling from the POSS when a promotional award coupon is redeemed as to a validation sequence of the promotional award coupon and the PCS checks the validity of the promotional award coupon against the stored records. The PCS signals the POSS as to the validity of the promotional award coupon for redemption and the PCS stores a record of the redemption of the promotional award coupon memory.

FIG. 4 is not intended to be all inclusive, and its is likely that there would be other casino systems to which the PCS will be connected when deployed.

Figure 5:
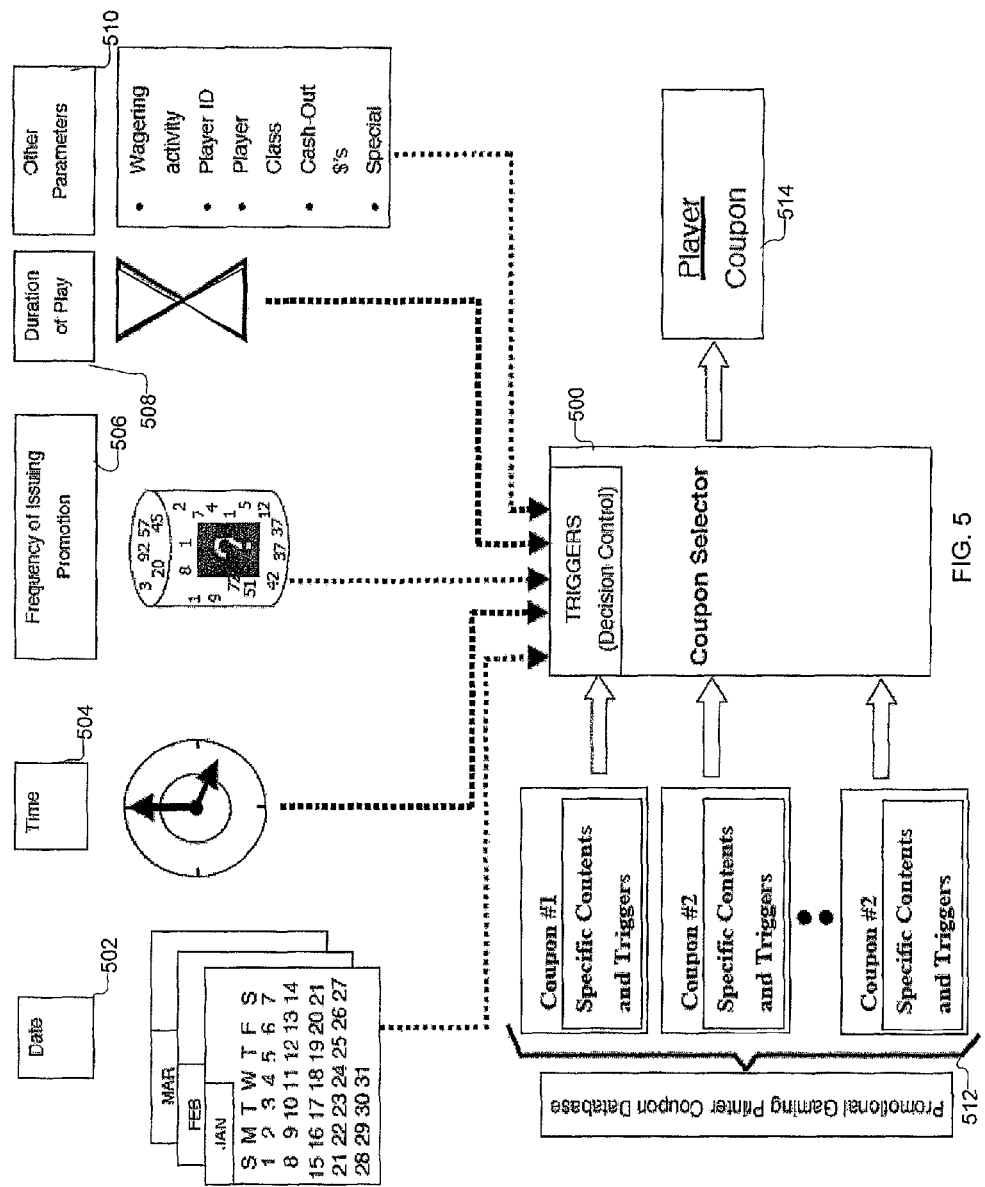
FIG. 5 is an illustration of an exemplary promotional database which includes defined coupons and triggers in accordance with an exemplary embodiment of the present invention.

FIG. 5 is an illustration of an exemplary promotional database which includes defined coupons and triggers in accordance with an exemplary embodiment of the present invention. FIG. 5 illustrates trigger matrix logic and process within the GVP 102a (of FIG. 1), the PCS 100 (of FIG. 1) or portions shared between the two, depending on where data processing of the PSP 202 (of FIG. 2) resides. At the top of the diagram are exemplary different logical triggers or play metrics utilized in the printer for initiating printing of the coupons. The five examples given are: date 502, time 504, frequency of issuance 506, duration of play 508, and other parameters 510 such as player I.D., amount of money in play, duration of the current session of play and the like. In the lower part of the diagram, the coupon database stack 512 is pictured. The stack of coupons are a plurality of pre-defined coupons which can printed anytime the set of trigger conditions to which they are associated are satisfied. These trigger conditions can operate independently or in logical combination. The coupon selector logic module 500 shown is tasked with analyzing trigger information as it becomes available and determine which coupon 514 should be printed in response to the information.

Additional processing, not shown, occurs in the PCS where the amount of coupons permitted in the campaign, an additional randomness of issue can be applied, and other possible global promotional campaign parameters may be checked before print authorization.

In addition, the play metrics may include: anytime a cash-out voucher is printed, printing of a cash-out voucher for greater than, equal to, or less than a specified amount of money, an amount of money wagered over a particular time period, an amount of money won over a particular time period, an amount of money lost over a particular time period, a duration of play on the gaming machine, anytime a player adds money or credits to the gaming machine in an amount greater than, equal to or less than a specified amount, a time when the gaming machine is played or cashed-out, a day when the gaming machine is played or cashed-out, a date when the gaming machine is played or cashed-out, an average percentage of the maximum wagering on the gaming machine which the player's activity represents, a random percentage chance that a coupon will be issued when a player cashes out, participation of a player in a frequent player club, a player's birthday date, for participating frequent player club members, classification of the player as applied to modify any play metrics.

In one embodiment of a gaming promotional system in accordance with the present invention, the GVP downloads from the PCS the play metrics and analyzes gaming machine activity passed to it by the PCS using the play metrics. The GVP then produces a coupon when the play metrics are satisfied.

In another embodiment of a gaming promotional system in accordance with the present invention, the PCS further includes a database storing a set of control parameters used to select a type and quantity of coupons to issue related to play metrics used to trigger issuance of coupons, the control parameters operating separately or in combination with each coupon.

In another embodiment of a gaming promotional system in accordance with the present invention, the GVP further includes a database storing a set of control parameters which are used to select a type and quantity of coupons to issue related to play metrics used to trigger issuance of coupons, the control parameters operating separately or in combination with each coupon.

In another embodiment of a gaming promotional system in accordance with the present invention, the control parameters include a total quantity of a coupon is issued before the coupon is retired, a frequency of issuance of a coupon, one issued every time a specified number of trigger events occurs, a frequency of issuance of a coupon based on a random chance of one in every so many trigger events, an alternative coupon should a particular coupon fail to print for lack of satisfying all of the coupon's play metrics or the coupon's specified set of control parameters.

Although the present invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents rather than the foregoing description.

What is claimed is:

1. A gaming environment promotional system, comprising:
    a central data processing unit that is a Promotional Coupon System (PCS); and
    at least one gaming machine installed Gaming Voucher Printer (GVP), the GVP coupled through a primary communication port to a controller of a respective gaming machine into which the GVP is installed, with each GVP further coupled to the PCS through a second auxiliary port,
    wherein the GVP receives signaling for cash-out vouchers through the primary communication port and signaling for coupons through the second auxiliary port,
    wherein the GVP is coupled to the PCS by a promotional network dedicated to the PCS to GVP connection, the network coupling a plurality of GVPs to the PCS, and
    the GVP is individually signaled by the PCS by using a unique address, and
    wherein the GVP stores an identification of the gaming machine into which the GVP is installed into a memory coupled to a processor of the GVP.

2. The gaming environment promotional system of claim 1, wherein the GVP's unique network address is configured by operator configurable address switches coupled to a processor of the GVP.

3. The gaming environment promotional system of claim 1, wherein the GVP's unique network address is assigned by the PCS, and
    the GVP stores the GVP's address in memory for permanent use until a new address is assigned to the GVP by the PCS.

4. The gaming environment promotional system of claim 1, wherein the GVP's unique network address is a fixed value as a function of the GVP's hardware.

5. The gaming environment promotional system of claim 1, wherein the PCS is a Player Tracking System (PTS) and the PTS's associated network.

6. The gaming environment promotional system of claim 1 wherein the dedicated PCS to GVP network, creates a logical link between the GVP's unique network address and the GVP's respective gaming machine for the purposes of correlating the GVP's gaming machine identifier, the GVP sends signals to the PCS using a link created from the GVP's unique address and gaming machine information from the GVP's respective gaming machine, and the PCS stores the link in a memory.

7. The gaming environment promotional system of claim 6, wherein the link is created using an extracted gaming machine address from voucher data signals received from a gaming machine controller coupled to the GVP's primary communication port.

8. The gaming environment promotional system of claim 6, wherein the link is created using operator configurable game machine identifier address switches coupled to a processor of the GVP.

9. The gaming environment promotional system of claim 1, wherein the PCS broadcasts time and date data on a periodic basis to the GVP, and the GVP uses the time and date data to synchronize the GVP's own internal clock.

10. The gaming environment promotional system of claim 1, wherein the GVP, upon receiving cash-out voucher signals from the gaming machine over the GVP's primary port, extracts time and date data from cash-out voucher signals and uses the time and date data to synchronize the GVP's internal clock.

11. The gaming promotional system of claim 1, wherein the PCS sends static data to the GVP, the static data including one or more fixed portions of printed indicia for promotional award coupons to be utilized by the GVP in printing promotional award coupons, and
the GVP stores the static data in a memory.

12. The gaming promotional system of claim 11, the static data further including coupon trigger metrics.

13. The gaming promotional system of claim 11, the static data further including coupon issuance control parameters.

14. The gaming promotional system of claim 11, the static data further including a unique promotional campaign identifier.

15. The gaming promotional system of claim 14, wherein the PCS sends variable data including portions of printed indicia for promotional award coupons to the GVP, the variable data including a unique promotional campaign identifier,
the GVP confirms that the promotional campaign identifier matches the previously stored static data, combines the fixed and variable portions of indicia data, and prints a promotional award coupon based on the combined fixed and variable portions of indicia data.

16. The gaming promotional system of claim 15, wherein the PCS requests the GVP to send status as to the identifier of the promotional campaign static data file which resides in the GVP's memory,
the PCS determines if the campaign identifier in the GVP matches an identifier of the promotional campaign that the PCS is currently operating, and if not, the PCS sends new promotional campaign static data to the GVP which matches the promotional campaign which the PCS is currently operating.

17. The gaming promotional system of claim 1, wherein the communications between the PCS and GVP are encrypted by a methodology known to the PCS and GVP, and the PCS and GVP process incoming and outgoing communications according to the encryption method.

18. The gaming promotional system of claim 1, further comprising a Player Tracking System (PTS) coupled to the PCS, wherein the communications between the PCS and the PTS are encrypted by a methodology known to the PCS and PTS, and the PCS and PTS process incoming and outgoing communications according to the encryption method.

19. A gaming environment promotional system, comprising:
a central data processing unit that is a Promotional Coupon System (PCS); and
at least one gaming machine installed Gaming Voucher Printer (GVP), the GVP coupled through a primary communication port to a controller of a respective gaming machine into which the GVP is installed, with each GVP further coupled to the PCS through a second auxiliary port,
wherein the GVP receives signaling for cash-out vouchers through the primary communication port and signaling for coupons through the second auxiliary port,
wherein the PCS is coupled to a plurality of GVPs through a dedicated PCS to GVP network, creating a logical link between the GVP's unique network address and the GVP's respective gaming machine for the purposes of correlating the GVP's gaming machine identifier,
wherein the GVP sends signals to the PCS using a link created from the GVP's unique address and gaming machine information from the GVP's respective gaming machine,
wherein the PCS stores the link in a memory, and
wherein the link is created using the game machine identifier address as signaled to the GVP by an operator controlled external device temporarily coupled to the GVP at the time the GVP is installed in the GVP's respective gaming machine.

20. The gaming environment promotional system of claim 19 wherein the GVP stores the identification of the gaming machine into which the GVP is installed into a memory coupled to a processor of the GVP.

21. A gaming environment promotional system, comprising:
a central data processing unit that is a Promotional Coupon System (PCS); and
at least one gaming machine installed Gaming Voucher Printer (GVP), the GVP coupled through a primary communication port to a controller of a respective gaming machine into which the GVP is installed, with each GVP further coupled to the PCS through a second auxiliary port, wherein the GVP receives signaling for cash-out vouchers through the primary communication port and signaling for coupons through the second auxiliary port,
wherein each GVP signals the PCS as to a game machine identifier address in which the GVP is installed upon boot-up or when requested by the PCS.

22. A gaming environment promotional system, comprising:
a central data processing unit that is a Promotional Coupon System (PCS);
at least one gaming machine installed Gaming Voucher Printer (GVP), the GVP coupled through a primary communication port to a controller of a respective gaming machine into which the GVP is installed, with each GVP further coupled to the PCS through a second auxiliary port, wherein the GVP receives signaling for cash-out vouchers through the primary communication port and signaling for coupons through the second auxiliary port; and
a cash-out voucher system coupled to the GVP and the PCS, wherein the cash-out voucher system sends a data packet to the GVP via a link to the gaming machine,
wherein the GVP forwards information from the data packet along with a unique network address to the PCS,
wherein the cash-out voucher system sends information from the data packet to the PCS,
wherein the PCS creates a logical link between the GVP's unique network address and the gaming machine into which the GVP is installed for the purposes of correlating the GVP's gaming machine identifier, and
wherein the PCS stores the link in a memory.

23. A gaming environment promotional system, comprising:
a central data processing unit that is a Promotional Coupon System (PCS);
at least one gaming machine installed Gaming Voucher Printer (GVP), the GVP coupled through a primary communication port to a controller of a respective gaming machine into which the GVP is installed, with each GVP further coupled to the PCS through a second auxiliary port, wherein the GVP receives signaling for cash-out vouchers through the primary communication port and signaling for coupons through the second auxiliary port; and wherein the GVP, after boot-up, receives cash-out voucher signals from the gaming machine over the GVP's primary port, and the GVP verifies that a first gaming machine identifier in the cash-out signals is the same as a second gaming machine identifier previously recorded in the GVP's memory as to which gaming machine the GVP is installed.

24. A gaming environment promotional system, comprising:
- a central data processing unit that is a Promotional Coupon System (PCS);
- at least one gaming machine installed Gaming Voucher Printer (GVP), the GVP coupled through a primary communication port to a controller of a respective gaming machine into which the GVP is installed, with each GVP further coupled to the PCS through a second auxiliary port, wherein the GVP receives signaling for cash-out vouchers through the primary communication port and signaling for coupons through the second auxiliary port; and
- a Player Tracking System (PTS) coupled to the PCS, the PCS receiving gaming machine activity data from the PTS which is monitoring a gaming machine,
- wherein the PCS utilizes a link table to determine a unique network address of the GVP installed in the gaming machine, and the PCS sends information extracted from the activity data to the GVP installed in the gaming machine.

25. A gaming environment promotional system, comprising:
- a central data processing unit that is a Promotional Coupon System (PCS); and
- at least one gaming machine installed Gaming Voucher Printer (GVP), the GVP coupled through a primary communication port to a controller of a respective gaming machine into which the GVP is installed, with each GVP further coupled to the PCS through a second auxiliary port, wherein the GVP receives signaling for cash-out vouchers through the primary communication port and signaling for coupons through the second auxiliary port; wherein
- the GVP receives player activity data of the gaming machine in which the GVP is installed from the PCS,
- the GVP processes the player activity data to determine if a promotional award has been triggered by the player activity data and a type of the promotional award,
- the GVP signals the PCS as to the metrics of the triggered promotional award, the PCS processes the metrics of the promotional award to create a validation identifier for the award coupon,
- the PCS signals the GVP with data including the validation identifier and authorization to print a promotional award coupon,
- the GVP prints the promotional award coupon, and
- the GVP signals the PCS as to the completion or failure of the printing of the promotional award coupon.

26. A gaming environment promotional system, comprising:
- a central data processing unit that is a Promotional Coupon System (PCS);
- at least one gaming machine installed Gaming Voucher Printer (GVP), the GVP coupled through a primary communication port to a controller of a respective gaming machine into which the GVP is installed, with each GVP further coupled to the PCS through a second auxiliary port, wherein the GVP receives signaling for cash-out vouchers through the primary communication port and signaling for coupons through the second auxiliary port; and
- a Player Tracking System (PTS) coupled to the PCS,
- wherein the PCS receives gaming machine activity data from the PTS which is monitoring the gaming machine,
- wherein the PCS processes the gaming machine activity data to determine if a promotional award has been triggered by the gaming machine activity data,
- wherein the PCS determines the type of award from a database,
- wherein the PCS creates a validation identifier for a promotional award coupon for the award,
- wherein the PCS signals the GVP with data including the validation identifier and authorization to print the promotional award coupon,
- wherein the GVP prints the promotional award coupon, and
- wherein the GVP signals the PCS as to the completion or failure of the printing of the promotional award coupon.

27. The gaming environment promotional system of claim 25 or 26, wherein the PCS creates a record in a memory as to issuance of the promotional award coupon upon completion or failure of the printing of the promotional award print job.

28. A gaming environment promotional system, comprising:
- a central data processing unit that is a Promotional Coupon System (PCS);
- at least one gaming machine installed Gaming Voucher Printer (GVP), the GVP coupled through a primary communication port to a controller of a respective gaming machine into which the GVP is installed, with each GVP further coupled to the PCS through a second auxiliary port, wherein the GVP receives signaling for cash-out vouchers through the primary communication port and signaling for coupons through the second auxiliary port; and
- The gaming promotional system of claim 1, further comprising a Point-Of-Sale System (POSS) coupled to the PCS, wherein
- the PCS stores records of promotional award coupons issued by GVPs in a memory,
- the PCS receives signaling from the POSS when a promotional award coupon is redeemed as to a validation sequence of the promotional award coupon,
- the PCS checks the validity of the promotional award coupon against the stored records,
- the PCS signals the POSS as to the validity of the promotional award coupon for redemption, and
- the PCS stores a record of the redemption of the promotional award coupon memory.

29. The gaming promotional system of claim 28, further comprising an accounting system coupled to the PCS, wherein the PCS transmits data related to outstanding and redeemed promotional award coupons from the PCS's memory to the accounting system.

30. The gaming promotional system of claim 28, further comprising PTS coupled to the PCS, wherein the PCS transmits data related to outstanding and redeemed promotional award coupons from the PCS's memory to the PTS.

31. A gaming environment promotional system, comprising:
- a central data processing unit that is a Promotional Coupon System (PCS); and
- at least one gaming machine installed Gaming Voucher Printer (GVP), the GVP coupled through a primary communication port to a controller of a respective gaming machine into which the GVP is installed, with each GVP further coupled to the PCS through a second auxiliary port, wherein the GVP receives signaling for cash-out vouchers through the primary communication port and signaling for coupons through the second auxiliary port, the GVP receives signaling from the PCS on the GVP's secondary auxiliary port to print a coupon, the GVP holds the coupon data in memory, the GVP receives signaling from the gaming machine to which the GVP is coupled on the GVP's primary port to print a cash-out voucher, the GVP prints the cash-out voucher, and when the cash-out voucher is successfully printed, the GVP prints the coupon from the coupon data held in memory.

32. A gaming environment promotional system, comprising:
- a central data processing unit that is a Promotional Coupon System (PCS); and
- at least one gaming machine installed Gaming Voucher Printer (GVP), the GVP coupled through a primary communication port to a controller of a respective gaming machine into which the GVP is installed, with each GVP further coupled to the PCS through a second auxiliary port,
- wherein the GVP receives signaling for cash-out vouchers through the primary communication port and signaling for coupons through the second auxiliary port, and
- wherein the PCS includes a coupon trigger database including play metrics that will cause the PCS to request the GVP to produce a coupon when the play metrics are satisfied.

33. The gaming promotional system of claim 32, wherein the play metrics are selected from the group including: anytime a cash-out voucher is printed, printing of a cash-out voucher for greater than, equal to, or less than a specified amount of money, an amount of money wagered over a particular time period, an amount of money won over a particular time period, an amount of money lost over a particular time period, a duration of play on the gaming machine, anytime a player adds money or credits to the gaming machine in an amount greater than, equal to or less than a specified amount, a time when the gaming machine is played or cashed-out, a day when the gaming machine is played or cashed-out, a date when the gaming machine is played or cashed-out, an average percentage of the maximum wagering on the gaming machine which the player's activity represents, a random percentage chance that a coupon will be issued when a player cashes out, participation of a player in a frequent player club, a player's birthday date, for participating frequent player club members, classification of the player as applied to modify any play metrics.

34. The gaming promotional system of claim 32, wherein the GVP downloads from the PCS the play metrics, the GVP analyzes gaming machine activity passed to it by the PCS using the play metrics, and the GVP produces a coupon when the play metrics are satisfied.

35. A gaming environment promotional system, comprising:
- a central data processing unit that is a Promotional Coupon System (PCS); and
- at least one gaming machine installed Gaming Voucher Printer (GVP), the GVP coupled through a primary communication port to a controller of a respective gaming machine into which the GVP is installed, with each GVP further coupled to the PCS through a second auxiliary port, wherein the GVP receives signaling for cash-out vouchers through the primary communication port and signaling for coupons through the second auxiliary port; and a database storing a set of control parameters which selects a type and quantity of coupons to issue related to play metrics used to trigger issuance of coupons, the control parameters operating separately or in combination with each coupon.

36. The gaming promotional system of claim 35, the control parameters selected from the group comprising a total quantity of a coupon is issued before the coupon is retired, a frequency of issuance of a coupon, one issued every time a specified number of trigger events occurs, a frequency of issuance of a coupon based on a random chance of one in every so many trigger events, an alternative coupon should a particular coupon fail to print for lack of satisfying all of the coupon's play metrics or the coupon's specified set of control parameters.

* * * * *